US009184440B2

(12) United States Patent
Ortega et al.

(10) Patent No.: US 9,184,440 B2
(45) Date of Patent: Nov. 10, 2015

(54) ELECTRODES AND RECHARGEABLE BATTERIES

(75) Inventors: Jeff Ortega, Camarillo, CA (US); George W. Adamson, Princeton Junction, NJ (US)

(73) Assignee: ZPower, LLC, Camarillo, CA (US)

(*) Notice: Subject to any disclaimer, the term of this patent is extended or adjusted under 35 U.S.C. 154(b) by 348 days.

(21) Appl. No.: 13/882,996

(22) PCT Filed: Nov. 2, 2011

(86) PCT No.: PCT/US2011/058877
§ 371 (c)(1),
(2), (4) Date: May 21, 2013

(87) PCT Pub. No.: WO2012/061449
PCT Pub. Date: May 10, 2012

(65) Prior Publication Data
US 2013/0230774 A1    Sep. 5, 2013

Related U.S. Application Data

(60) Provisional application No. 61/409,658, filed on Nov. 3, 2010.

(51) Int. Cl.
*H01M 4/50* (2010.01)
*H01M 4/38* (2006.01)
*H01M 10/24* (2006.01)
*H01M 4/505* (2010.01)

(52) U.S. Cl.
CPC *H01M 4/38* (2013.01); *H01M 4/50* (2013.01); *H01M 4/505* (2013.01); *H01M 10/24* (2013.01); *Y02E 60/124* (2013.01)

(58) Field of Classification Search
CPC .............................. H01M 4/50; H01M 4/505
See application file for complete search history.

(56) References Cited

U.S. PATENT DOCUMENTS

| | | | |
|---|---|---|---|
| 2,528,891 A | 11/1950 | Lawson | |
| 3,062,909 A | 11/1962 | Reutschi et al. | |
| 3,325,311 A | 6/1967 | Huff | |
| 3,920,478 A | 11/1975 | Kozawa | |
| 3,954,501 A | 5/1976 | Rampel | |
| 4,167,609 A | 9/1979 | Scarr | |
| 4,327,157 A | 4/1982 | Himy et al. | |
| 4,338,385 A | 7/1982 | Ohya et al. | |
| 4,407,915 A | 10/1983 | Brown | |
| 4,465,747 A | 8/1984 | Evans | |
| 4,520,087 A | 5/1985 | Kamata et al. | |
| 5,204,195 A | 4/1993 | Tomantschger et al. | |
| 5,290,640 A | 3/1994 | Tsenter et al. | |
| 5,599,644 A | 2/1997 | Swierbut et al. | |
| 6,187,475 B1 | 2/2001 | Oh et al. | |
| 6,277,169 B1 | 8/2001 | Hampden-Smith et al. | |
| 6,337,160 B1 | 1/2002 | Hilarius et al. | |
| 8,936,775 B2 | 1/2015 | Adamson et al. | |
| 2003/0207173 A1 | 11/2003 | Wang et al. | |
| 2003/0215712 A1 | 11/2003 | Feddrix et al. | |
| 2005/0074394 A1 | 4/2005 | Berube et al. | |
| 2006/0147809 A1* | 7/2006 | Amine | H01M 10/0567 429/326 |
| 2006/0228629 A1 | 10/2006 | Christian et al. | |
| 2008/0038630 A1 | 2/2008 | Cheiky | |
| 2008/0187824 A1* | 8/2008 | Tomantschger | H01M 4/14 429/122 |
| 2008/0261094 A1* | 10/2008 | Licht | H01M 4/06 429/403 |
| 2010/0047689 A1 | 2/2010 | Bugnet et al. | |
| 2011/0052981 A1* | 3/2011 | Lopez | C01G 45/1257 429/206 |
| 2011/0262803 A1 | 10/2011 | Huang et al. | |
| 2011/0286912 A1 | 11/2011 | Adamson et al. | |
| 2012/0164526 A1 | 6/2012 | Adamson et al. | |
| 2013/0071744 A1 | 3/2013 | Zhou et al. | |
| 2013/0216901 A1 | 8/2013 | Ortega et al. | |
| 2014/0227591 A1 | 8/2014 | Adamson et al. | |

FOREIGN PATENT DOCUMENTS

| | | |
|---|---|---|
| GB | 1065059 | 4/1967 |
| GB | 2019079 | 10/1979 |
| JP | 53-80530 | 7/1978 |
| JP | 54-008839 | 1/1979 |
| JP | 56-149771 | 11/1981 |
| JP | 58-119156 | 7/1983 |
| JP | 59-132567 | 7/1984 |
| JP | 59-184459 | 10/1984 |
| JP | 60-189164 | 9/1985 |
| JP | 2000164220 A * | 6/2000 |
| JP | 2004-213927 | 7/2004 |
| WO | 03/096448 | 11/2003 |
| WO | 2005/088011 | 9/2005 |
| WO | 2008/004105 | 1/2008 |
| WO | 2008/007288 | 1/2008 |
| WO | 2011/056813 | 5/2011 |
| WO | 2014/052533 | 4/2014 |

OTHER PUBLICATIONS

International Search Report for PCT/US2011/058877 Dated Feb. 8, 2012.
International Search Report for PCT/US2010/055204 Dated Mar. 3, 2011.
International Search Report for PCT/US2013/061834 Dated Feb. 26, 2014.

* cited by examiner

*Primary Examiner* — Ula C Ruddock
*Assistant Examiner* — Scott J Chmielecki
(74) *Attorney, Agent, or Firm* — Honigman Miller Schwartz and Cohn LLP; Andrew N. Weber; Jonathan P. O'Brien

(57) ABSTRACT

The present invention provides cathodes, methods of making cathodes, and electrochemical cells (e.g., batteries) that employ these cathodes having improved properties over traditional cathodes, methods, or electrochemical cells.

15 Claims, No Drawings

ELECTRODES AND RECHARGEABLE BATTERIES

CROSS REFERENCE TO RELATED APPLICATION

This U.S. patent application claims the benefit of PCT application no. PCT/US2011/058877, filed on Nov. 2, 2011, which claims the benefit of U.S. provisional application Ser. No. 61/409,658, filed on Nov. 3, 2010. The entire contents of these applications are incorporated herein by reference.

FIELD OF THE INVENTION

This invention relates to a novel cathode formed by mixing a stabilizing agent with a cathode active material to form an electrode having improved properties over traditional cathodes.

BACKGROUND

Rechargeable batteries are known in the art and commonly used, for example, in portable electronic devices. Although conventional rechargeable batteries are useful, the systems and methods used to recharge the batteries are nevertheless susceptible to improvements that may enhance or improve their service life, shelf life, and/or performance.

When a traditional battery is discharged, the anode supplies positive ions to an electrolyte and electrons to an external circuit. The cathode is typically an electronically conducting host into which positive ions are inserted reversibly from the electrolyte as a guest species and are charge-compensated by electrons from the external circuit. A secondary battery, or cell, uses a reaction that can be reversed when current is applied to the battery; thus, "recharging" the battery. The chemical reactions at the anode and cathode of a secondary battery must be reversible. On charge, the removal of electrons from the cathode by an external field releases positive ions back to the electrolyte to restore the parent host structure, and the addition of electrons to the anode by the external field attracts charge-compensating positive ions back into the anode to restore it to its original composition.

Traditional electrode materials such as cathode materials suffer a number of drawbacks. For instance, many traditional cathodes lose charge capacity over several charge cycles, they are Coulombically inefficient, or they possess an elevated impedance or internal resistance that negatively effects battery discharge. As many traditional batteries progress through charge cycles, these deleterious effects generally cause an increased hindrance on battery performance.

Thus, there is a need for electrode materials that have improved properties and can improve battery performance.

SUMMARY OF THE INVENTION

The present invention provides a novel cathode material, a rechargeable battery made therefrom, and methods of producing the novel cathode material.

In one aspect, the present invention provides a cathode for use in a rechargeable battery comprising a cathode active material comprising a stabilizing agent comprising a powder having a mean particle diameter of about 200 nm or less (e.g., about 150 nm or less, or about 100 nm or less); and manganese, wherein the stabilizing agent is present in an amount sufficient to impart the cathode with a Coulombic efficiency of greater than about 98%.

In some embodiments, the cathode active material comprises manganese, and the manganese comprises Mn, MnO, $MnO_2$, $Mn_2O_3$, $Mn_3O_4$, $Mn(OH)_2$, $Mn(OH)_4$, $MnO_2(OH)_2$, $Mn(OH)_3$, MnOOH, $Mn(ONa)_2$, $Mn(OK)_2$, $Mn(OLi)_2$, $Mn(ORb)_2$, MnOONa, MnOOK, MnOOLi, MnOORb, $ZnFeMnO_2$, $(MnFe)_2O_3$, $NiMnO_4$, any hydrate thereof, or any combination thereof.

In some embodiments, the manganese further comprises Pb, B, Al, Ga, Zn, Ni, Pd, In, or any combination thereof. For example, the manganese further comprises Pb, B, Al, Ga, Zn, Ni, Pd, In, or any combination thereof as a dopant or coating. In one example, the manganese is doped with a first dopant comprising Pb, B, Al, Ga, Zn, Ni, Pd, In, Ag, or any combination thereof. For instance, the manganese is doped with a first dopant comprising Ga. In another example, the manganese is coated with a coating agent comprising Pb, B, Al, Ga, Zn, Ni, Pd, In, Ag, or any combination thereof. For instance, the manganese is coated with a coating agent comprising Pb.

In other embodiments, the stabilizing agent comprises a powder comprising a p-type semiconductor, an n-type semiconductor, or any combination thereof. For example, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $B_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, Ultramarine, or any combination thereof, wherein x is 1-4. For example, the stabilizing agent comprises a powder comprising ZnO. In some examples, the ZnO is doped with a dopant (e.g., a second dopant) comprising $Al_2O_3$, iron oxide, indium oxide, or any combination thereof. For instance, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$.

In some embodiments, the stabilizing agent comprises a powder, and the powder comprises particles comprising $SiO_2$, $ZrO_2$, and ZnO. For example, the stabilizing agent comprises a powder comprising $SiO_2$ particles, $ZrO_2$ particles, and ZnO particles. And, in some examples, the ZnO particles are doped with a second dopant comprising $Al_2O_3$. For example, the ZnO particles comprise from about 1 wt % to about 10 wt % of $Al_2O_3$ by weight of the ZnO particles.

In some embodiments, the cathode active material comprises about 0.5 wt % or less of the stabilizing agent by weight of the cathode active material. For example, the cathode active material comprises from about 0.01 wt % to about 0.3 wt % of the stabilizing agent by weight of the cathode active material.

In other embodiments, the cathode further comprises a binder. For example, the cathode comprises a binder, and the binder comprises PTFE.

Another aspect of the present invention provides a rechargeable battery comprising a cathode comprising a cathode active material comprising manganese and a stabilizing agent; an anode comprising zinc; and an electrolyte, wherein the stabilizing agent comprises a powder having a mean particle diameter of 200 nm or less, the manganese associates with one or more particles of the stabilizing agent, and the stabilizing agent is present in an amount sufficient to impart the cathode with a Coulombic efficiency of greater than about 98%.

In some embodiments, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $B_2O_3$, $LiAlO_2$, $BaTiO_3$, $Li_{4-x}Ca_xSiO_4$, $Bi_2O_3$, $Yb_2O_3$, Ultramarine, or any combination thereof, wherein x is 1-4. For example, the stabilizing agent comprises a powder comprising ZnO. In some instances, the ZnO is doped with a second dopant comprising $Al_2O_3$, iron oxide, indium oxide, or any combination thereof. In others, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In some examples, the stabilizing agent comprises a powder, and the powder comprises a plurality of particles comprising $SiO_2$, $ZrO_2$, and ZnO. For instance, the stabilizing agent comprises a powder comprising $SiO_2$ particles, $ZrO_2$ particles, and ZnO particles. In other examples, the ZnO particles are doped with a second dopant comprising $Al_2O_3$. For instance, the ZnO particles comprise from about 1 wt % to about 10 wt % of $Al_2O_3$ by weight of the ZnO particles.

In other embodiments, the manganese comprises Mn, MnO, $MnO_2$, $Mn_2O_3$, $Mn_3O_4$, $Mn(OH)_2$, $Mn(OH)_4$, $MnO_2(OH)_2$, $Mn(OH)_3$, MnOOH, $Mn(ONa)_2$, $Mn(OK)_2$, $Mn(OLi)_2$, $Mn(ORb)_2$, MnOONa, MnOOK, MnOOLi, MnOORb, $ZnFeMnO_2$, $(MnFe)_2O_3$, $NiMnO_4$, any hydrate thereof, or any combination thereof. In some examples, the manganese further comprises Pb, B, Al, Ga, Zn, Ni, Pd, In, Ag, or any combination thereof. For instance, the manganese is doped with a first dopant comprising Pb, B, Al, Ga, Zn, Ni, Pd, In, Ag, or any combination thereof. In other instances, the manganese is coated with a coating agent comprising Pb, B, Al, Ga, Zn, Ni, Pd, In, Ag, or any combination thereof. And, in some examples, the manganese is coated with a coating agent comprising Pb, and the manganese is doped with a first dopant comprising Ga.

In some embodiments, the cathode active material comprises about 7 wt % or less of the stabilizing agent by weight of the cathode active material. For example, the cathode active material comprises from about 0.01 wt % to about 0.3 wt % of the stabilizing agent by weight of the cathode active material.

In some embodiments, the cathode further comprises a binder. For example, the cathode comprises a binder, and the binder comprises PTFE.

Another aspect of the present invention provides an electrochemical cell comprising a cathode comprising a cathode active material comprising manganese and a stabilizing agent; an anode comprising Zn; and an electrolyte, wherein the stabilizing agent comprises a powder having a mean particle diameter of 200 nm or less, the manganese is associated with at least one particle of a stabilizing agent, and the cathode active material comprises a sufficient amount of stabilizing agent such that the cell retains a substantially constant charge capacity after more than about 70 charge cycles.

In some embodiments, the manganese comprises Mn, MnO, $MnO_2$, $Mn_2O_3$, $Mn_3O_4$, $Mn(OH)_2$, $Mn(OH)_4$, $MnO_2(OH)_2$, $Mn(OH)_3$, MnOOH, $Mn(ONa)_2$, $Mn(OK)_2$, $Mn(OLi)_2$, $Mn(ORb)_2$, MnOONa, MnOOK, MnOOLi, MnOORb, $ZnFeMnO_2$, $(MnFe)_2O_3$, $NiMnO_4$, any hydrate thereof, or any combination thereof. In some examples, the manganese further comprises Pb, B, Al, Ga, Zn, Ni, Pd, In, Ag, or any combination thereof. For instance, the manganese is doped with a first dopant comprising Pb, B, Al, Ga, Zn, Ni, Pd, In, Ag, or any combination thereof. In other instances, the manganese is coated with a coating agent comprising Pb, B, Al, Ga, Zn, Ni, Pd, In, Ag, or any combination thereof. And, in some examples, the manganese is coated with a coating agent comprising Pb, and the manganese is doped with a first dopant comprising Ga.

In some embodiments, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $B_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, Ultramarine, or any combination thereof, wherein x is 1-4. For example, the stabilizing agent comprises a powder comprising ZnO. In some instances, the ZnO is doped with a second dopant comprising $Al_2O_3$, iron oxide, indium oxide, or any combination thereof. In others, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In some examples, the stabilizing agent comprises a powder, and the powder comprises a plurality of particles comprising $SiO_2$, $ZrO_2$, and ZnO. For instance, the stabilizing agent comprises a powder comprising $SiO_2$ particles, $ZrO_2$ particles, and ZnO particles. In other examples, the ZnO particles are doped with a second dopant comprising $Al_2O_3$. For instance, the ZnO particles comprise from about 1 wt % to about 10 wt % of $Al_2O_3$ by weight of the ZnO particles.

In some embodiments, the cathode active material comprises about 7 wt % or less of the stabilizing agent by weight of the cathode active material. For example, the cathode active material comprises from about 0.01 wt % to about 0.3 wt % of the stabilizing agent by weight of the cathode active material.

Another aspect of the present invention provides a method of producing a cathode comprising providing manganese; providing a stabilizing agent comprising a powder having a mean particle diameter of no more than about 200 nm (e.g., no more than about 150 nm or no more than about 100 nm); and associating the manganese material with one or more particles of the stabilizing agent.

In some implementations, the manganese comprises Mn, MnO, $MnO_2$, $Mn_2O_3$, $Mn_3O_4$, $Mn(OH)_2$, $Mn(OH)_4$, $MnO_2(OH)_2$, $Mn(OH)_3$, MnOOH, $Mn(ONa)_2$, $Mn(OK)_2$, $Mn(OLi)_2$, $Mn(ORb)_2$, MnOONa, MnOOK, MnOOLi, MnOORb, $ZnFeMnO_2$, $(MnFe)_2O_3$, $NiMnO_4$, any hydrate thereof, or any combination thereof. In some examples, the manganese further comprises Pb, B, Al, Ga, Zn, Ni, Pd, In, Ag, or any combination thereof. For instance, the manganese is doped with a first dopant comprising Pb, B, Al, Ga, Zn, Ni, Pd, In, Ag, or any combination thereof. In other instances, the manganese is coated with a coating agent comprising Pb, B, Al, Ga, Zn, Ni, Pd, In, Ag, or any combination thereof. And, in some examples, the manganese is coated with a coating agent comprising Pb, and the manganese is doped with a first dopant comprising Ga.

In other implementations, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $B_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, Ultramarine, or any combination thereof, wherein x is 1-4. For example, the stabilizing agent comprises a powder comprising ZnO. In some instances, the ZnO is doped with a second dopant comprising $Al_2O_3$, iron oxide, indium oxide, or any combination thereof. In others, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In some examples, the stabilizing agent comprises a powder, and the powder comprises a plurality of particles comprising $SiO_2$, $ZrO_2$, and ZnO. For instance, the stabilizing agent comprises a powder comprising $SiO_2$ particles, $ZrO_2$ particles, and ZnO particles. In other examples, the ZnO particles are doped with a second dopant comprising $Al_2O_3$. For instance, the ZnO particles comprise from about 1 wt % to about 10 wt % of $Al_2O_3$ by weight of the ZnO particles.

Another aspect of the present invention provides a method of improving the Coulombic efficiency of a manganese cathode comprising adding a stabilizing agent to the manganese cathode, wherein the stabilizing agent comprises a powder, and the powder has a mean particle diameter of no more than 200 nm (e.g., no more than 150 nm or no more than 100 nm).

In some implementations, the manganese comprises Mn, MnO, $MnO_2$, $Mn_2O_3$, $Mn_3O_4$, $Mn(OH)_2$, $Mn(OH)_4$, $MnO_2(OH)_2$, $Mn(OH)_3$, MnOOH, $Mn(ONa)_2$, $Mn(OK)_2$, $Mn(OLi)_2$, $Mn(ORb)_2$, MnOONa, MnOOK, MnOOLi, MnOORb, $ZnFeMnO_2$, $(MnFe)_2O_3$, $NiMnO_4$, any hydrate thereof, or any combination thereof. In some examples, the manganese cathode further comprises Pb, B, Al, Ga, Zn, Ni, Pd, In, Ag, or any combination thereof. For instance, the manganese cathode is doped with a dopant comprising Pb, B, Al, Ga, Zn, Ni, Pd, In, Ag, or any combination thereof. In other examples, the manganese cathode is coated with a coating agent comprising Pb, B, Al, Ga, Zn, Ni, Pd, In, Ag, or any combination thereof.

In other implementations, the stabilizing agent comprises powder comprising a p-type semiconductor, an n-type semiconductor, or any combination thereof. For example, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $B_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, Ultramarine, or any combination thereof, wherein x is 1-4. For example, the stabilizing agent comprises a powder comprising ZnO. In some instances, the ZnO is doped with a second dopant comprising $Al_2O_3$, iron oxide, indium oxide, or any combination thereof. In other instances, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In some examples, the stabilizing agent comprises a powder, the powder comprises a plurality of particles comprising $SiO_2$, $ZrO_2$, and ZnO. In other examples, the stabilizing agent comprises a powder comprising $SiO_2$ particles, $ZrO_2$ particles, and ZnO particles. In some of these examples, the ZnO particles are doped with $Al_2O_3$. For instance, the ZnO particles are doped with from about 1 wt % to about 10 wt % of $Al_2O_3$ by weight of the ZnO particles.

Some implementations further comprise adding about 7 wt % or less of the stabilizing agent by weight of the manganese cathode. Some examples comprise adding from about 0.01 wt % to about 0.2 wt % of stabilizing agent by weight of the manganese cathode.

In some implementations, the manganese cathode further comprises a binder. For example, the cathode comprises a binder, and the binder comprises PTFE.

Another aspect of the present invention provides a rechargeable battery comprising a cathode comprising a cathode active material comprising manganese and a stabilizing agent; an anode comprising zinc; and an electrolyte, wherein the stabilizing agent comprises a powder having a mean particle diameter of about 200 nm or less (e.g., about 150 nm or less or about 100 nm or less), and the rechargeable battery provides at least 200 mAh/g of manganese per discharge for a period of at least 100 consecutive charge cycles.

In some embodiments, the battery provides at least 200 mAh/g of manganese per discharge for a period of at least 120 consecutive charge cycles.

In other embodiments, the battery provides more than 200 mAh/g of manganese per discharge for a period of at least 100 consecutive charge cycles.

In some embodiments, the battery provides at least 20 Ah/g of manganese of aggregate capacity over a period of no more than 250 consecutive charge cycles.

In some embodiments, the manganese comprises Mn, MnO, $MnO_2$, $Mn_2O_3$, $Mn_3O_4$, $Mn(OH)_2$, $Mn(OH)_4$, $MnO_2(OH)_2$, $Mn(OH)_3$, MnOOH, $Mn(ONa)_2$, $Mn(OK)_2$, $Mn(OLi)_2$, $Mn(ORb)_2$, MnOONa, MnOOK, MnOOLi, MnOORb, $ZnFeMnO_2$, $(MnFe)_2O_3$, $NiMnO_4$, any hydrate thereof, or any combination thereof. In some examples, the manganese further comprises Pb, B, Al, Ga, Zn, Ni, Pd, In, Ag, or any combination thereof. For instance, the manganese is doped with a first dopant comprising Pb, B, Al, Ga, Zn, Ni, Pd, In, Ag, or any combination thereof. In other instances, the manganese is coated with a coating agent comprising Pb, B, Al, Ga, Zn, Ni, Pd, In, Ag, or any combination thereof. And, in some examples, the manganese is coated with a coating agent comprising Pb, and the manganese is doped with a first dopant comprising Ga.

In other embodiments, the stabilizing agent comprises powder comprising a p-type semiconductor, an n-type semiconductor, or any combination thereof. For example, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $B_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, Ultramarine, or any combination thereof, wherein x is 1-4. For example, the stabilizing agent comprises a powder comprising ZnO. In some instances, the ZnO is doped with a second dopant comprising $Al_2O_3$, iron oxide, indium oxide, or any combination thereof. In other instances, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In some examples, the stabilizing agent comprises a powder, the powder comprises a plurality of particles comprising $SiO_2$, $ZrO_2$, and ZnO. In other examples, the stabilizing agent comprises a powder comprising $SiO_2$ particles, $ZrO_2$ particles, and ZnO particles. In some of these examples, the ZnO particles are doped with $Al_2O_3$. For instance, the ZnO particles are doped with from about 1 wt % to about 10 wt % of $Al_2O_3$ by weight of the ZnO particles.

In some embodiments, the cathode active material comprises about 7 wt % or less of the stabilizing agent by weight of the manganese cathode. For example, the cathode active material comprises from about 0.01 wt % to about 0.2 wt % of stabilizing agent by weight of the manganese cathode.

Another aspect of the present invention provides a rechargeable battery comprising a cathode comprising a cathode active material comprising manganese and a stabilizing agent; an anode comprising zinc; and an electrolyte, wherein the stabilizing agent comprises a powder having a mean particle diameter of about 200 nm or less (e.g., about 150 nm or less or about 100 nm or less), and the rechargeable battery provides a battery capacity of at least 140 mAh/g of manganese per discharge for a period of at least 100 consecutive charge cycles.

In some embodiments, the battery provides a battery capacity of at least 140 mAh/g of manganese per discharge for a period of at least 150 consecutive charge cycles.

In other embodiments, the battery provides a battery capacity of more than 140 mAh/g of manganese per discharge for a period of at least 100 consecutive charge cycles.

In some embodiments, the battery provides at least 14 Ah/g of manganese aggregate capacity over a period of no more than 1000 consecutive charge cycles.

And, in other embodiments, the battery provides at least 200 mAh/g of manganese per discharge for a period of at least 150 consecutive charge cycles.

In some embodiments, the manganese comprises Mn, MnO, $MnO_2$, $Mn_2O_3$, $Mn_3O_4$, $Mn(OH)_2$, $Mn(OH)_4$, $MnO_2(OH)_2$, $Mn(OH)_3$, MnOOH, $Mn(ONa)_2$, $Mn(OK)_2$, $Mn(OLi)_2$, $Mn(ORb)_2$, MnOONa, MnOOK, MnOOLi, MnOORb, $ZnFeMnO_2$, $(MnFe)_2O_3$, $NiMnO_4$, any hydrate thereof, or any combination thereof. In some examples, the manganese further comprises Pb, B, Al, Ga, Zn, Ni, Pd, In, Ag, or any combination thereof. For instance, the manganese is doped with a first dopant comprising Pb, B, Al, Ga, Zn, Ni, Pd, In, Ag, or any combination thereof. In other instances, the manganese is coated with a coating agent comprising Pb, B, Al, Ga, Zn, Ni, Pd, In, Ag, or any combination thereof. And, in some examples, the manganese is coated with a coating agent comprising Pb, and the manganese is doped with a first dopant comprising Ga.

In other embodiments, the stabilizing agent comprises powder comprising a p-type semiconductor, an n-type semiconductor, or any combination thereof. For example, the stabilizing agent comprises a powder comprising $ZnO$, $SiO_2$, $ZrO_2$, $TiO_2$, $Al_2O_3$, $MgO$, $SiC$, $In_2O_3$, $Ho_2O_3$, $ZnTiO_3$, $B_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, Ultramarine, or any combination thereof, wherein x is 1-4. For example, the stabilizing agent comprises a powder comprising $ZnO$. In some instances, the $ZnO$ is doped with a second dopant comprising $Al_2O_3$, iron oxide, indium oxide, or any combination thereof. In other instances, the $ZnO$ is doped with a second dopant comprising $Al_2O_3$. In other examples, the stabilizing agent comprises a powder comprising $ZrO_2$. And, in some examples, the stabilizing agent comprises a powder comprising $SiO_2$. In some examples, the stabilizing agent comprises a powder, the powder comprises a plurality of particles comprising $SiO_2$, $ZrO_2$, and $ZnO$. In other examples, the stabilizing agent comprises a powder comprising $SiO_2$ particles, $ZrO_2$ particles, and $ZnO$ particles. In some of these examples, the $ZnO$ particles are doped with $Al_2O_3$. For instance, the $ZnO$ particles are doped with from about 1 wt % to about 10 wt % of $Al_2O_3$ by weight of the $ZnO$ particles.

In some embodiments, the cathode active material comprises about 7 wt % or less (e.g., about 0.5 wt % or less, about 0.3 wt % or less, or about 0.2 wt % or less) of the stabilizing agent by weight of the manganese cathode. For example, the cathode active material comprises from about 0.01 wt % to about 0.2 wt % of stabilizing agent by weight of the manganese cathode.

And, another aspect of the present invention provides a rechargeable battery comprising a cathode comprising a cathode active material comprising manganese and a stabilizing agent; an anode comprising zinc; and an electrolyte, wherein the stabilizing agent comprises a powder having a mean particle diameter of 100 nm or less, and the rechargeable battery provides at least 12 Ah of aggregate battery capacity per gram of manganese over a period of no more than 1000 consecutive charge cycles.

DETAILED DESCRIPTION OF THE INVENTION

The present invention provides cathodes, methods of making cathodes, and electrochemical cells (e.g., batteries) that have improved properties over traditional cathodes, methods, or electrochemical cells.

I. DEFINITIONS

As used herein, the term "battery" encompasses electrical storage devices comprising one electrochemical cell (e.g., a button cell, a coin cell, or the like) or a plurality of electrochemical cells. A "secondary battery" is rechargeable, whereas a "primary battery" is not rechargeable. For secondary batteries of the present invention, a battery anode is designated as the positive electrode during discharge, and as the negative electrode during charge.

As used herein, the terms "manganese" or "manganese material" refer to any manganese compound such as Mn, MnO, $MnO_2$, $Mn_2O_3$, $Mn_3O_4$, $Mn(OH)_2$, $Mn(OH)_4$, $MnO_2(OH)_2$, $Mn(OH)_3$, MnOOH, $Mn(ONa)_2$, $Mn(OK)_2$, $Mn(OLi)_2$, $Mn(ORb)_2$, MnOONa, MnOOK, MnOOLi, MnOORb, $ZnFeMnO_2$, $(MnFe)_2O_3$, $NiMnO_4$, any hydrate thereof, or any combination thereof. Note that 'hydrates' of manganese include hydroxides of manganese. Because it is believed that the coordination sphere surrounding a manganese atom is dynamic during charging and discharging of the cell wherein the manganese serves as a cathode, or when the oxidation state of the manganese atom is in a state of flux, it is intended that the term 'manganese' or 'manganese material' encompass any of these manganese oxides and hydrates (e.g., hydroxides). Terms 'manganese' or 'manganese material' also includes any of the abovementioned species that are doped and/or coated with dopants and/or coatings that enhance one or more properties of the manganese. Exemplary dopants and coatings are provided below. In some examples, manganese or manganese material includes a manganese oxide further comprising a first row transition metal dopant or coating. For example, manganese includes manganese-copper-oxide, manganese-iron-oxide, silver-manganese-oxide (e.g., $AgMnO_2$), manganese-chromium-oxide, manganese-scandium-oxide, manganese-cobalt-oxide, manganese-titanium-oxide, manganese-vanadium-oxide, hydrates thereof, or any combination thereof. Note that the term "oxide" used herein does not, in each instance, describe the number of oxygen atoms present in the manganese or manganese material. One generic formula for manganese oxide is $MnO_x(OH)_y(H_2O)_z$, wherein x, y, and z are real numbers or zero, and at least one of x, y, or z is greater than zero. For example, a manganese oxide may have a chemical formula of $Mn(OH)_2$, $MnO_2$, $Mn_3O_4$, $Mn_2O_3$, or a combination thereof. Furthermore, manganese can comprise a bulk material or manganese can comprise a powder having any suitable mean particle diameter.

As used herein, "iron oxide" refers to any oxide or hydroxide of iron, e.g., FeO, $Fe_2O_3$, $Fe_3O_4$, or any combination thereof.

As used herein, "indium oxide" refers to any oxide or hydroxide of indium, e.g., $In_2O_3$.

As used herein, the terms "tetravalent manganese oxide" "manganese dioxide" and "$MnO_2$" are used interchangeably.

As used herein, the term "alkaline battery" refers to a primary battery or a secondary battery, wherein the primary or secondary battery comprises an alkaline electrolyte.

As used herein, a "dopant" or "doping agent" refers to a chemical compound that is added to a substance in low concentrations in order to alter the optical/electrical properties of the semiconductor. For example, a dopant may be added to the powder active material of a cathode to improve its electronic properties (e.g., reduce its impedance and/or resistivity). In other examples, doping occurs when one or more atoms of a crystal lattice of a bulk material is substituted with one or more atoms of a dopant.

As used herein, an "electrolyte" refers to a substance that behaves as an electrically conductive medium. For example, the electrolyte facilitates the mobilization of electrons and cations in the cell. Electrolytes include mixtures of materials such as aqueous solutions of alkaline agents. Some electrolytes also comprise additives such as buffers. For example, an electrolyte comprises a buffer comprising a borate or a phosphate. Exemplary electrolytes include, without limitation, aqueous KOH, aqueous NaOH, or the liquid mixture of KOH in a polymer.

As used herein, "alkaline agent" refers to a base or ionic salt of an alkali metal (e.g., an aqueous hydroxide of an alkali metal). Furthermore, an alkaline agent forms hydroxide ions when dissolved in water or other polar solvents. Exemplary alkaline electrolytes include without limitation LiOH, NaOH, KOH, CsOH, RbOH, or combinations thereof. Electrolytes can optionally include other salts to modify the total ionic strength of the electrolyte, for example KF or $Ca(OH)_2$.

A "cycle" or "charge cycle" refers to a consecutive charge and discharge of a cell or a consecutive discharge and charge of a cell, either of which includes the duration between the consecutive charge and discharge or the duration between the consecutive discharge and charge. For example, a cell undergoes one cycle when, freshly prepared, it is discharged to about 100% of its DOD and re-charged to about 100% of its state of charge (SOC). In another example, a freshly prepared cell undergoes 2 cycles when the cell is:
1) Cycle 1: discharged to about 100% of its DOD and re-charged to about 100% SOC; followed by
2) Cycle 2: a second discharge to about 100% of its DOD and re-charged to about 100% SOC.

It is noted that this process may be repeated to subject a cell to as many cycles as is desired or practical.

For convenience, the polymer name "polytetrafluoroethylene" and its corresponding initials "PTFE" are used interchangeably as adjectives to distinguish polymers, solutions for preparing polymers, and polymer coatings. Use of these names and initials in no way implies the absence of other constituents. These adjectives also encompass substituted and co-polymerized polymers. A substituted polymer denotes one for which a substituent group, a methyl group, for example, replaces a hydrogen on the polymer backbone.

As used herein, "Ah" refers to Ampere (Amp) Hour and is a scientific unit for the capacity of a battery or electrochemical cell. A derivative unit, "mAh" represents a milliamp hour and is $1/1000$ of an Ah.

As used herein, "maximum voltage" or "rated voltage" refers to the maximum voltage an electrochemical cell can be charged without interfering with the cell's intended utility. For example, in several zinc-manganese electrochemical cells that are useful in portable electronic devices, the maximum voltage is less than about 2.3 V, or about 2.0 V. In other batteries, such as lithium ion batteries that are useful in portable electronic devices, the maximum voltage is less than about 15.0 V (e.g., less than about 13.0 V, or about 12.6 V or less). The maximum voltage for a battery can vary depending on the number of charge cycles constituting the battery's useful life, the shelf-life of the battery, the power demands of the battery, the configuration of the electrodes in the battery, and the amount of active materials used in the battery.

As used herein, an "anode" is an electrode through which (positive) electric current flows into a polarized electrical device. In a battery or galvanic cell, the anode is the negative electrode from which electrons flow during the discharging phase in the battery. The anode is also the electrode that undergoes chemical oxidation during the discharging phase. However, in secondary, or rechargeable, cells, the anode is the electrode that undergoes chemical reduction during the cell's charging phase. Anodes are formed from electrically conductive or semiconductive materials, e.g., metals, metal oxides, metal alloys, metal composites, semiconductors, or the like. Common anode materials include Si, Sn, Al, Ti, Mg, Fe, Bi, Zn, Sb, Ni, Pb, Li, Zr, Hg, Cd, Cu, $LiC_6$, mischmetals, alloys thereof, oxides thereof, or composites thereof. Anode materials such as zinc may even be sintered.

Anodes may have many configurations. For example, an anode may be configured from a conductive mesh or grid that is coated with one or more anode materials. In another example, an anode may be a solid sheet or bar of anode material.

As used herein, a "cathode" is an electrode from which (positive) electric current flows out of a polarized electrical device. In a battery or galvanic cell, the cathode is the positive electrode into which electrons flow during the discharging phase in the battery. The cathode is also the electrode that undergoes chemical reduction during the discharging phase. However, in secondary or rechargeable cells, the cathode is the electrode that undergoes chemical oxidation during the cell's charging phase. Cathodes are formed from electrically conductive or semiconductive materials, e.g., metals, metal oxides, metal alloys, metal composites, semiconductors, or the like. Common cathode materials include Mn, MnO, $Mn_2O_3$, $MnO_2$, HgO, $Hg_2O$, Ag, $Ag_2O$, AgO, CuO, CdO, NiOOH, $Pb_2O_4$, $PbO_2$, $LiFePO_4$, $Li_3V_2(PO_4)_3$, $V_6O_{13}$, $V_2O_5$, $Fe_3O_4$, $Fe_2O_3$, $MnO_2$, $LiCoO_2$, $LiNiO_2$, $LiMn_2O_4$, or composites thereof. Cathode materials such as Mn, MnO, $MnO_2$, $Mn_2O_3$, $Mn_3O_4$, and MnOOH, may even be sintered.

Cathodes may also have many configurations. For example, a cathode may be configured from a conductive mesh that is coated with one or more cathode materials. In another example, a cathode may be a solid sheet or bar of cathode material.

As used herein, the term "Coulombic efficacy" refers to the number of Coulombs removed from a battery cell on discharge divided by the number of Coulombs that are added into the cell on charge.

As used herein, the term "electronic device" is any device that is powered by electricity. For example, and electronic device can include a portable computer, a portable music player, a cellular phone, a portable video player, or any device that combines the operational features thereof.

As used herein, the term "cycle life" is the maximum number of times a secondary battery can be cycled while retaining a capacity useful for the battery's intended use (e.g., the number of times a cell may be cycled until the cell's 100% SOC, i.e., its actual capacity, is less than 90% of its rated capacity (e.g., less than 85% of its rated capacity, about 90% of its rated capacity, or about 80% of its rated capacity). In some instances, 'cycle life' is the number of times a secondary battery or cell can be cycled until the cell's 100% SOC is at least about 60 percent of its rated capacity (e.g., at least about 70 percent of its rated capacity, at least about 80 percent of its rated capacity, at least 90 percent of its rated capacity, at least 95 percent of its rated capacity, about 90% of its rated capacity, or about 80% of its rated capacity).

As used herein, the symbol "M" denotes molar concentration.

Batteries and battery electrodes are denoted with respect to the active materials in the fully-charged state. For example, a zinc-manganese battery comprises an anode comprising zinc and a cathode comprising a manganese powder (e.g., $MnO_2$). Nonetheless, more than one species is present at a battery electrode under most conditions. For example, a zinc electrode generally comprises zinc metal and zinc oxide (except when fully charged), and a manganese powder electrode usually comprises MnO, $Mn_2O_3$, $Mn_3O_4$ and/or $MnO_2$ and manganese metal (except when fully discharged).

As used herein, the term "oxide" applied to alkaline batteries and alkaline battery electrodes encompasses corresponding "hydroxide" species, which are typically present, at least under some conditions.

As used herein, the term, "powder" refers to a dry, bulk solid composed of a plurality of fine particles that may flow freely when shaken or tilted.

As used herein, the term, "mean diameter" or "mean particle diameter" refers to the diameter of a sphere that has the same volume/surface area ratio as a particle of interest.

As used herein, the terms "substantially stable" or "substantially inert" refer to a compound or component that remains substantially chemically unchanged in the presence of an alkaline electrolyte (e.g., potassium hydroxide) and/or in the presence of an oxidizing agent (e.g., manganese ions present in the cathode or dissolved in the electrolyte).

As used herein, "charge profile" refers to a graph of an electrochemical cell's voltage or capacity with time. A charge profile can be superimposed on other graphs such as those including data points such as charge cycles or the like.

As used herein, "resistivity" or "impedance" refers to the internal resistance of a cathode in an electrochemical cell. This property is typically expressed in units of Ohms or micro-Ohms.

As used herein, the terms "first" and/or "second" do not refer to order or denote relative positions in space or time, but these terms are used to distinguish between two different elements or components. For example, a first separator does not necessarily proceed a second separator in time or space; however, the first separator is not the second separator and vice versa. Although it is possible for a first separator to precede a second separator in space or time, it is equally possible that a second separator precedes a first separator in space or time.

As used herein, the term "nanometer" and "nm" are used interchangeably and refer to a unit of measure equaling $1 \times 10^{-9}$ meters.

As used herein, the terms "analogous cathode" refer to a cathode of a pair of cathodes wherein the cathodes of the pair are substantially identical to each other (e.g., use substantially the same amount of cathode materials (e.g., manganese, binder, dopants, coatings, or any combination thereof); and/or using substantially the same methods of manufacturing) whose most significant difference is that one cathode of the pair is substantially free of stabilizing agent.

As used herein, the term "Ultramarine" refers to a blue pigment consisting primarily of a double silicate of aluminum and sodium with some sulfides or sulfates, and occurring in nature as a proximate component of lapis lazuli. The pigment color code is P. Blue 29 77007. Ultramarine is one of the most complex mineral pigments, a complex sulfur-containing sodio-silicate ($Na_{8-10}Al_6Si_6O_{24}S_{2-4}$), essentially a mineralized limestone containing a blue cubic mineral called lazurite (the major component in lapis lazuli). Some chloride is often present in the crystal lattice as well. The blue color of the pigment is due to the $S^{3-}$ radical anion, which contains an unpaired electron. 'Ultramarine' also refers to mixed aluminum silicates such as those prepared in a laboratory setting.

As used herein, the term "cathode active material" refers to a composition that includes manganese, as described above (e.g., doped manganese, coated manganese, manganese that is doped or coated, or any combination thereof), and one or more stabilizing agents.

As used herein, the terms "battery capacity" or "capacity" refer to the mathematical product of a battery's discharge current and the time (in hours) during which the current is discharged.

As used herein, the terms "aggregate capacity" or "aggregate battery capacity" refers to the sum of a battery's capacities, i.e., the sum of the individual products of discharge current and the time during which the current is discharged after being discharged to about 100 percent depth of discharge (e.g., more than 97.5% depth of discharge, or more than 99% depth of discharge) over a course of one or more charge cycles.

As used herein, "depth of discharge" and "DOD" are used interchangeably to refer to the measure of how much energy has been withdrawn from a battery or cell, often expressed as a percentage of capacity, e.g., rated capacity. For example, a 100 Ah battery from which 30 Ah has been withdrawn has undergone a 30% depth of discharge (DOD).

As used herein, "state of charge" and "SOC" and used interchangeably to refer to the available capacity remaining in a battery, expressed as a percentage of the cell or battery's rated capacity.

II. CATHODES OF THE PRESENT INVENTION

One aspect of the present invention provides a cathode for use in a rechargeable battery comprising a cathode active material comprising a stabilizing agent comprising a powder having a mean particle diameter of 100 nm or less; and manganese, wherein the stabilizing agent is present in an amount sufficient to impart the cathode with a Coulombic efficiency of greater than about 90% (e.g., greater than about 95% or greater than about 98%).

In some embodiments, the cathode active material comprises manganese, and the manganese comprises Mn, MnO, $MnO_2$, $Mn_2O_3$, $Mn_3O_4$, $Mn(OH)_2$, $Mn(OH)_4$, $MnO_2(OH)_2$, $Mn(OH)_3$, MnOOH, $Mn(ONa)_2$, $Mn(OK)_2$, $Mn(OLi)_2$, $Mn(ORb)_2$, MnOONa, MnOOK, MnOOLi, MnOORb, $ZnFeMnO_2$, $(MnFe)_2O_3$, $NiMnO_4$, any hydrate thereof, or any combination thereof. In other embodiments, the manganese further comprises Pb, B, Al, Ga, Zn, Ni, Pd, In, or any combination thereof. For example, the manganese is doped with a first dopant comprising Pb, B, Al, Ga, Zn, Ni, Pd, In, Ag, or any combination thereof. In another example, the manganese is doped with a first dopant comprising Ga. In alternative examples, manganese is coated with a coating agent comprising Pb, B, Al, Ga, Zn, Ni, Pd, In, Ag, or any combination thereof. In some instances, the manganese is coated with a coating agent comprising Pb. And, in other examples, the manganese is doped with a first dopant comprising Ga, and the manganese is coated with a coating agent comprising Pb.

In some embodiments, the manganese of the cathode active material comprises a powder or a bulk material (e.g., a manganese foil, manganese pellets, a combination thereof, or the like).

In some embodiments, the stabilizing agent comprises a powder comprising a p-type semiconductor, an n-type semiconductor, or any combination thereof. For example, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $B_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, Ultramarine, or any combination thereof, wherein x is 1-4. In alternative examples, the stabilizing agent comprises a powder comprising ZnO. And, in some examples, the ZnO is doped with a second dopant comprising $Al_2O_3$, iron oxide, indium oxide, or any combination thereof. In some instances, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In some examples, the stabilizing agent comprises a powder, and the powder comprises a plurality of particles comprising $SiO_2$, $ZrO_2$, and ZnO. In other examples, the stabilizing agent comprises a powder comprising $SiO_2$ particles, $ZrO_2$ particles, and ZnO particles. In some instances, the ZnO particles are doped with a second dopant comprising $Al_2O_3$. In other instances, the ZnO particles comprise from about 1 wt % to about 10 wt % of $Al_2O_3$ by weight of the ZnO particles.

In some embodiments, the cathode active material comprises about 7 wt % or less (e.g., about 5 wt % or less, about 2 wt % or less, about 1 wt % or less, or about 0.2 wt % or less) of the stabilizing agent. For example, the cathode active material comprises from about 0.005 wt % to about 0.5 wt % (e.g., from about 0.01 wt % to about 0.2 wt %) of the stabilizing agent.

In other embodiments, the cathode further comprises a binder. Binders suited for use in cathodes of the present invention may comprise any material that can sequester manganese powder particles and are substantially inert in the presence of strong alkaline solutions and manganese compounds (e.g., $MnO_2$ or the like). In some examples, the cathode comprises a binder comprising PTFE. In other examples, the binder comprises PVDF.

In some embodiments, the cathode active material comprises a powder that comprises a plurality of particles comprising manganese and a plurality of particles comprising a stabilizing agent, wherein at least one particle of manganese is associated with at least one particle of a stabilizing agent, the plurality of particles of the stabilizing agent have a mean particle diameter of 100 nm or less, and the stabilizing agent is present in an amount sufficient to impart the cathode with a Coulombic efficacy of greater than about 90% (e.g., greater than about 95% or greater than about 98%).

Another aspect of the present invention provides a cathode for use in a rechargeable battery comprising a cathode active material comprising a stabilizing agent comprising a powder having a mean particle diameter of 100 nm or less; and manganese, wherein the stabilizing agent is present in an amount sufficient to impart the cathode with a Coulombic efficiency that is at least 10% higher than an analogous cathode whose only significant difference is the absence of a stabilizing agent.

Another aspect of the present invention provides a cathode for use in a rechargeable battery comprising a cathode material, and the cathode material comprises a powder. The powder comprises a plurality of particles comprising manganese and a plurality of particles having a mean particle diameter of 100 nm or less comprising a stabilizing agent, wherein at least one particle of manganese is associated with at least one particle of a stabilizing agent, wherein the stabilizing agent is present in an amount sufficient to impart the cathode with a Coulombic efficiency that is at least 10% higher than an analogous cathode whose only significant difference is the absence of a stabilizing agent.

Manganese is associated with the at least one particle of stabilizing agent when that particle of stabilizing agent is completely embedded in manganese, partially embedded in the manganese, contacting a surface of an manganese particle, or almost contacting a surface of a manganese particle (e.g., within 10 nm of an $MnO_2$ surface), whether the manganese comprises a powder or a bulk material.

Cathodes of the present invention can include any suitable stabilizing agent so long as the stabilizing agent is in the form of a powder that comprises particles having a mean diameter of about 100 nm or less. For instance, the stabilizing agent may comprises a p-type semiconductor, an n-type semiconductor, or a combination thereof. Or, the stabilizing agent comprises a plurality of particles comprising ZnO, $SiO_2$, $ZrO_2$, $TiO_2$, $Al_2O_3$, MgO, SiC, $In_2O_3$, $Ho_2O_3$, $ZnTiO_3$, $B_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, Ultramarine, or any combination thereof, wherein x is 1-4. Also, the stabilizing agent may be present in any suitable amount. For instance, the stabilizing agent is present in an amount of about 7 wt % or less (e.g., about 5 wt % or less, about 1.5 wt % or less, or about 0.5 wt % or less (e.g., about 0.45 wt % or less, about 0.30 wt % or less, about 0.20 wt % or less, or about 0.15 wt % or less) by weight of the cathode material. In other instances, the stabilizing agent is present in an amount of from about 0.01 wt % to about 0.2 wt % by weight of the cathode material.

The particles that comprise the stabilizing agent may be further modified to improve one or more of their chemical, electrical, or physical properties. For example, the stabilizing agent particles may be doped and/or coated with any suitable additive that does not substantially impair the ability of the stabilizing agent to associate with Manganese. Also, the stabilizing agent can comprise any suitable combination of n-type and/or p-type semiconductor particles.

In several embodiments, the stabilizing agent comprises ZnO. For example, the stabilizing agent comprises ZnO that is doped with $Al_2O_3$. In other embodiments, the stabilizing agent comprises $ZrO_2$. In still other embodiments, the stabilizing agent comprises $SiO_2$. In some instances, the $SiO_2$ is doped with $Al_2O_3$. For example, the $SiO_2$ is doped with from about 1 wt % to about 10 wt % of $Al_2O_3$ by weight of the $SiO_2$.

In several embodiments, the stabilizing agent comprises a plurality of particles and each of the particles comprises $SiO_2$, $ZrO_2$, or ZnO (e.g., ZnO that is doped with $Al_2O_3$). In some instances, the stabilizing agent comprises a plurality of particles comprising a combination of $SiO_2$ particles, $ZrO_2$ particles, and ZnO particles. In other instances, the ZnO particles are doped with $Al_2O_3$. For example, the ZnO particles are doped with from about 1 wt % to about 10 wt % of $Al_2O_3$ by weight of the doped ZnO particles.

Also, cathodes of the present invention can include manganese that is doped or coated. For example, the manganese is doped with a doping agent comprising Pb, B, Al, Ga, Zn, Ni, Pd, In, Ag, or any combination thereof. Or, the manganese is coated with a coating agent comprising Pb, B, Al, Ga, Zn, Ni, Pd, In, Ag, or any combination thereof.

Cathodes of the present invention can further include optional additives such as a colorant, a current collector, or the like. For example, a cathode material may comprises a binder such as PTFE.

Another aspect of the present invention provides a cathode for use in a rechargeable battery comprising a cathode material, and the cathode material comprises a powder. The powder comprises particles comprising manganese that is associated with a first stabilizing agent (e.g., ZnO or ZnO doped with $Al_2O_3$), particles comprising manganese that is associated with a second stabilizing agent (e.g., $ZrO_2$), and particles comprising manganese that is associated with a third stabilizing agent (e.g., $SiO_2$). Any of the manganese (e.g., doped manganese and/or coated manganese), described above, is useful in this aspect of the present invention.

III. RECHARGEABLE BATTERIES OF THE PRESENT INVENTION

Another aspect of the present invention provides a rechargeable battery comprising a cathode comprising a cathode active material comprising manganese and a stabilizing agent; an anode comprising zinc; and an electrolyte, wherein the stabilizing agent comprises a powder having a mean particle diameter of 100 nm or less, the manganese associates with one or more particles of the stabilizing agent, and the stabilizing agent is present in an amount sufficient to impart the cathode with a Coulombic efficiency of greater than about 90% (e.g., greater than about 95% or greater than about 98%).

In some embodiments, the manganese comprises Mn, MnO, $MnO_2$, $Mn_2O_3$, $Mn_3O_4$, $Mn(OH)_2$, $Mn(OH)_4$, $MnO_2(OH)_2$, $Mn(OH)_3$, MnOOH, $Mn(ONa)_2$, $Mn(OK)_2$, $Mn(OLi)_2$, $Mn(ORb)_2$, MnOONa, MnOOK, MnOOLi, MnOORb, $ZnFeMnO_2$, $(MnFe)_2O_3$, $NiMnO_4$, any hydrate thereof, or any combination thereof. In other embodiments, the manganese further comprises Pb, B, Al, Ga, Zn, Ni, Pd, In, Ag, or any combination thereof. For example, the manganese is doped with a first dopant comprising Pb, B, Al, Ga, Zn, Ni, Pd, In, Ag, or any combination thereof. In other examples, the manganese is coated with a coating agent comprising Pb, B, Al, Ga, Zn, Ni, Pd, In, Ag, or any combination thereof. For instance, the manganese is coated with a coating agent comprising Pb. In some instances, the manganese is coated with a coating agent comprising Pb, and the manganese is doped with a first dopant comprising Ga.

In some embodiments, the stabilizing agent comprises a powder comprising a p-type semiconductor, an n-type semiconductor, or any combination thereof. For example, the stabilizing agent comprises a powder comprising ZnO, $SiO_2$, $ZrO_2$, $TiO_2$, $Al_2O_3$, MgO, SiC, $In_2O_3$, $Ho_2O_3$, $ZnTiO_3$, $B_2O_3$, $LiAlO_2$, $BaTiO_3$, $Li_{4-x}Ca_xSiO_4$, $Li_{4-x}Mg_xSiO_4$, $Bi_2O_3$, $Yb_2O_3$, Ultramarine, or any combination thereof, wherein x is 1-4. In alternative examples, the stabilizing agent comprises a powder comprising ZnO. And, in some examples, the ZnO is doped with a second dopant comprising $Al_2O_3$, iron oxide, indium oxide, or any combination thereof. In some instances, the ZnO is doped with a second dopant comprising $Al_2O_3$. In other examples, the stabilizing agent comprises a powder comprising $ZrO_2$. And, in some examples, the stabilizing agent comprises a powder comprising $SiO_2$. In some examples, the stabilizing agent comprises a powder, and the powder comprises a plurality of particles comprising $SiO_2$, $ZrO_2$, and ZnO. In other examples, the stabilizing agent comprises a powder comprising $SiO_2$ particles, $ZrO_2$ particles, and ZnO particles. In some instances, the ZnO particles are doped with a second dopant comprising $Al_2O_3$. In other instances, the ZnO particles comprise from about 1 wt % to about 10 wt % of $Al_2O_3$ by weight of the ZnO particles.

In other embodiments, the cathode active material comprises about 7 wt % or less of the stabilizing agent. For example, the cathode active material comprises from about 0.01 wt % to about 0.2 wt % of the stabilizing agent.

Another aspect of the present invention provides a rechargeable battery comprising a cathode comprising a cathode material comprising a powder; an anode comprising zinc; and an electrolyte, wherein the powder comprises particles of manganese and particles of stabilizing agent having a mean particle diameter of 100 nm or less, at least one particle of manganese is associated with at least one particle of stabilizing agent, and the stabilizing agent is present in an amount sufficient to impart the cathode with an activity of greater than about 90% (e.g., greater than about 95% or greater than about 98%).

Another aspect of the present invention provides an electrochemical cell comprising a cathode comprising a cathode material comprising a powder, wherein the powder comprises a plurality of particles comprising manganese that are associated with at least one particle of a stabilizing agent, and the stabilizing agent comprises a plurality of particles having a mean particle diameter of 100 nm or less; an anode comprising Zn; and an electrolyte, wherein the cathode of the electrochemical cell has sufficient stabilizing agent such that the cell retains a substantially constant capacity after more than 70 charge cycles.

In some embodiments, the rechargeable battery comprising a cathode comprising a cathode active material comprising manganese and a stabilizing agent; an anode comprising zinc; and an electrolyte, wherein the stabilizing agent comprises a powder having a mean particle diameter of 100 nm or less, and the rechargeable battery provides a battery capacity of at least 140 mAh/g of manganese per discharge for a period of at least 100 consecutive charge cycles.

In some embodiments, the battery provides a battery capacity of at least 140 mAh/g of manganese per discharge for a period of at least 150 consecutive charge cycles. In other embodiments, the battery provides a battery capacity of more than 140 mAh/g of manganese per discharge for a period of at least 100 consecutive charge cycles. In some embodiments, the battery provides at least 14 Ah/g of manganese aggregate capacity over a period of no more than 1000 consecutive charge cycles. And, in other embodiments, the battery provides at least 200 mAh/g of manganese per discharge for a period of at least about 150 (e.g., about 175 or more) consecutive charge cycles.

In other embodiments, the rechargeable battery comprising a cathode comprising a cathode active material comprising manganese and a stabilizing agent; an anode comprising zinc; and an electrolyte, wherein the stabilizing agent comprises a powder having a mean particle diameter of 100 nm or less, and the rechargeable battery provides at least 12 Ah of aggregate battery capacity per gram of manganese over a period of no more than 1000 consecutive charge cycles.

In some embodiments, the rechargeable battery provides a battery capacity of at least 140 mAh per gram of manganese per discharge for a period of at least 150 consecutive charge cycles. For instance, the rechargeable battery provides a battery capacity of more than 140 mAh per gram of manganese per discharge for a period of at least 100 consecutive charge cycles.

Another aspect of the present invention provides a rechargeable battery comprising a cathode comprising a cathode active material comprising manganese and a stabilizing agent; an anode comprising zinc; and an electrolyte, wherein the stabilizing agent comprises a powder having a mean particle diameter of 100 nm or less, and the rechargeable battery provides an aggregate capacity of at least 12 Ah per gram of manganese over a period of no more than 1000 consecutive charge cycles.

Any of the cathodes and cathode materials described above are suitable for use in a rechargeable battery of the present invention.

Furthermore, rechargeable batteries of the present invention may comprise any suitable electrolyte. For instance, the electrolyte comprises an alkaline agent having any suitable concentration. In one example, the alkaline agent comprises LiOH, NaOH, KOH, CsOH, RbOH, or any combination thereof. In other examples, the alkaline agent comprises a combination of NaOH and KOH.

IV. METHODS OF THE PRESENT INVENTION

The present invention also provides methods of producing a cathode described above.

In one aspect of the present invention, the method of producing a cathode comprises providing manganese; providing a stabilizing agent comprising a powder having a mean particle diameter of no more than about 100 nm; and associating the manganese material with one or more particles of the stabilizing agent.

In some methods, the manganese comprises Mn, MnO, $MnO_2$, $Mn_2O_3$, $Mn_3O_4$, $Mn(OH)_2$, $Mn(OH)_4$, $MnO_2(OH)_2$, $Mn(OH)_3$, MnOOH, $Mn(ONa)_2$, $Mn(OK)_2$, $Mn(OLi)_2$, $Mn(ORb)_2$, MnOONa, MnOOK, MnOOLi, MnOORb, ZnFeMnO$_2$, (MnFe)$_2$O$_3$, NiMnO$_4$, any hydrate thereof, or any combination thereof. In other methods, the manganese further comprises Pb, B, Al, Ga, Zn, Ni, Pd, In, Ag, or any combination thereof. For example, the manganese is doped with a first dopant comprising Pb, B, Al, Ga, Zn, Ni, Pd, In, Ag, or any combination thereof. In some instances, the manganese is doped with a first dopant comprising Ga. In other examples, the manganese is coated with a coating agent comprising Pb, B, Al, Ga, Zn, Ni, Pd, In, Ag, or any combination thereof. For instance, the manganese is coated with a coating agent comprising Pb. In some instances, the manganese is coated with a coating agent comprising Pb, and the manganese is doped with a first dopant comprising Ga.

In other methods, the stabilizing agent comprises a powder comprising ZnO, SiO$_2$, ZrO$_2$, TiO$_2$, Al$_2$O$_3$, MgO, SiC, In$_2$O$_3$, Ho$_2$O$_3$, ZnTiO$_3$, B$_2$O$_3$, LiAlO$_3$, BaTiO$_3$, Li$_{4-x}$Ca$_x$SiO$_4$, Li$_{4-x}$Mg$_x$SiO$_4$, Bi$_2$O$_3$, Yb$_2$O$_3$, Ultramarine, or any combination thereof, wherein x is 1-4. For example, the stabilizing agent comprises a powder comprising ZnO. In some instances, the ZnO is doped with a second dopant comprising Al$_2$O$_3$, iron oxide, indium oxide, or any combination thereof. For example, the ZnO is doped with a second dopant comprising Al$_2$O$_3$. In other examples, the stabilizing agent comprises a powder comprising ZrO$_2$. And, in some examples, the stabilizing agent comprises a powder comprising SiO$_2$. In alternative examples, the stabilizing agent comprises a powder, and the powder comprises a plurality of particles comprising SiO$_2$, ZrO$_2$, and ZnO. In some examples, the stabilizing agent comprises a powder comprising SiO$_2$ particles, ZrO$_2$ particles, and ZnO particles. In some instances, the ZnO particles are doped with a second dopant comprising Al$_2$O$_3$. For example, ZnO particles are doped with from about 1 wt % to about 10 wt % of a second dopant comprising Al$_2$O$_3$ by weight of the ZnO particles.

Some methods further comprise providing about 7 wt % or less of the stabilizing agent. For example, providing from about 0.01 wt % to about 0.2 wt % of the stabilizing agent.

Another aspect of the present invention provides a method of improving the Coulombic efficiency of a manganese cathode comprising adding a stabilizing agent to the manganese cathode, wherein the stabilizing agent comprises a powder, and the powder has a mean particle diameter of no more than 100 nm.

Some methods further comprise adding about 7 wt % or less of the stabilizing agent by weight of the manganese cathode. For example, adding from about 0.01 wt % to about 0.2 wt % of the stabilizing agent.

In some methods, the manganese cathode further comprises a binder such as PTFE.

V. EXAMPLES

A. Methods of Formulating Exemplary Cathodes

It is noted that the examples provided below are exemplary in nature and do not encompass the entire scope of the present invention. Materials used for the preparation of cathodes of the present invention can, in many cases, include substitutions. For instance, a KOH alkaline solution can be substituted with NaOH, LiOH, CsOH, combinations thereof, or the like. And the oxidizer K$_2$S$_2$O$_8$ and also be substituted with Na$_2$S$_2$O$_8$ or other oxidizing agents. Other substitutions are also possible. For instance, gelatin may be replaced by another surfactant. Also, in many instances nanopowders comprising stabilizing agents may be used interchangeably or in any suitable combination.

Materials:
Manganese nitrate tetrahyrate: A.C.S. grade, Alfa-Aesar
Potassium permanganate: A.C.S. grade, Sigma-Aldrich
Potassium hydroxide solution: 40 wt % KOH solution, prepared from KOH pellets,
Potassium persulfate, 99+%, Sigma-Aldrich
Zinc oxide: doped with 6% Al, nanopowder, <50 nm (BET), >97%, Sigma-Aldrich
Zirconium(IV) oxide: nanopowder, <100 nm particle size (BET), Sigma-Aldrich
Silica: nanopowder, <5 nm, Nyacol Nano Technologies Inc.

Example 1

Production of MnO$_2$ Cathode

In a 2 L glass reactor, Mn(NO$_3$)$_2$×4H$_2$O (187.67 g) is added to H$_2$O (1000 g) at 55° C. while stirring with an overhead mechanical stirrer at 400 rpm. Gelatin (0.12 g) is then added to the stirring solution.

After allowing to stir at 55° C. for 10 min, a mixture of 40% wt KOH (260 g, aq.) and H$_2$O (260 g) is pumped in at a rate of 17.5 g/min using size 16 master-flex tubing for 20 min. The temperature of the glass reactor is then increased to 65° C. K$_2$S$_2$O$_8$ (404.21 g) is then added to the reactor all at once immediately upon reaching 65° C. The reaction is allowed to stir at 65° C. for 50 min.

Upon cooling, the solution is decanted away and the solid particles are washed with H$_2$O (2 L×8) until the conductivity of the wash measures less than 20 μS. The resulting material is filtered and dried at 60° C. in a vacuum oven.

This process may generate ~65 g of MnO$_2$ (yield>99%).

In a 2 L Erlenmeyer flask, 60 g of dry MnO$_2$ powder, produced using the method above, is added to 700 g of DI water. The mixture is stirred with an overhead stirrer at a stir speed of 250 rpm. 2.242 g of lead acetate trihydrate is dissolved in 100 g of DI water and added dropwise to the MnO$_2$ mixture with a MasterFlex pump. Once the addition is complete, the lead solution container is rinsed with 50 g DI water twice and the dropwise addition continued.

60 min after the lead acetate addition, stirring is stopped, the MnO$_2$ particles are permitted to settle, and the water is decanted. This rinse and decant procedure is repeated until the ion conductivity measures less than 20 micro-Ohms. The resulting material is filtered and dried at 60° C. in a vacuum oven.

Example 2

Exemplary Cathode Material Including a ZnO—Al$_2$O$_3$ Stabilizing Agent

In a 2 L glass reactor, Mn(NO$_3$)$_2$×4H$_2$O (187.67 g) is added to H$_2$O (1000 g) at 55° C. while stirring with an overhead mechanical stirrer at 400 rpm. Then a H$_2$O (100 g) suspension of 26 mg ZnO—Al$_2$O$_3$ is added, followed by gelatin (0.12 g).

After allowing to stir at 55° C. for 10 min, a mixture of 40% wt KOH (260 g, aq.) and H$_2$O (260 g) is pumped in at a rate of 17.5 g/min using size 16 master-flex tubing for 20 min. The temperature of the glass reactor is then increased to 65° C. K$_2$S$_2$O$_8$ (404.21 g) is then added to the reactor all at once immediately upon reaching 65° C. The reaction is allowed to stir at 65° C. for 50 min. Upon cooling, the solution is decanted away and the solid particles are then washed with H$_2$O (2 L×8) until the conductivity of the wash measures less than 20 μS. The resulting material is filtered and dried at 60° C. in a vacuum oven.

This process may generate ~65 g of MnO$_2$ (yield>99%).

In a 2 L Erlenmeyer flask, 60 g of the dry $MnO_2$ powder, produced above, is added to 700 g of DI water. The mixture is stirred with overhead stirrer using a stir speed of 400 rpm. 2.242 g of lead acetate trihydrate is dissolved in 100 g DI water and added dropwise to the $MnO_2$ mixture with a MasterFlex pump. Once the addition is complete, the lead solution container is rinsed with 50 g DI water twice and the dropwise addition continued.

60 min after the lead acetate addition, stirring is stopped, the $MnO_2$ particles are permitted to settle, and the water is decanted. The rinse and decant procedure is repeated until the ion conductivity measures less than 20 micro-Ohms. The resulting material is filtered and dried at 60° C. using a vacuum oven.

Example 3

Exemplary Cathode Material Including a $SiO_2$ Stabilizing Agent

In a 2 L glass reactor, $Mn(NO_3)_2 \times 4H_2O$ (187.67 g) is added to $H_2O$ (1000 g) at 55° C. while stirring with an overhead mechanical stirrer at 400 rpm. 14 mg of silica is dispersed in 100 g of DI water and added. Gelatin (0.12 g) is then added to the stirred solution.

After allowing to stir at 55° C. for 10 min, a mixture of 40% wt KOH (260 g, aq.) and $H_2O$ (260 g) is pumped in at a rate of 17.5 g/min using size 16 master-flex tubing for 20 min. The temperature of the glass reactor is then increased to 65° C. $K_2S_2O_8$ (404.21 g) is then added to the reactor all at once immediately upon reaching 65° C. The reaction is allowed to stir at 65° C. for 50 min. Upon cooling, the solution is decanted away and the solid particles were then washed with $H_2O$ (2 L×8) until the conductivity of the wash is less than 20 μS. The resulting material is filtered and dried at 60° C. in a vacuum oven.

This process may generate ~65 g of $MnO_2$ (yield>99%).

In a 2 L Erlenmeyer flask, 60 g of the dry $MnO_2$ powder, produced above, is added to 700 g of DI water. The mixture is stirred with overhead stirrer using a stir speed of 400 rpm. 2.242 g of lead acetate trihydrate is dissolved in 100 g DI water and added dropwise to the $MnO_2$ mixture with a MasterFlex pump. Once the addition is complete, the lead solution container is rinsed with 50 g DI water twice and the dropwise addition continued.

60 min after the lead acetate addition, stirring is stopped, the $MnO_2$ particles are permitted to settle, and the water is decanted. This rinse and decant procedure is repeated until the ion conductivity measures less than 20 micro-Ohms. The resulting material is filtered and dried the material at 60° C. using a vacuum oven.

Example 4

Exemplary Cathode Material Including a $ZrO_2$ Stabilizing Agent

In a 2 L glass reactor, $Mn(NO_3)_2 \times 4H_2O$ (187.67 g) is added to $H_2O$ (1000 g) at 55° C. while stirring with an overhead mechanical stirrer at 400 rpm. 130 mg zirconium (IV) oxide is dispersed in 100 g of DI water then added. Gelatin (0.12 g) is then added to the stirred solution.

After allowing to stir at 55° C. for 10 min, a mixture of 40% wt KOH (260 g, aq.) and $H_2O$ (260 g) is pumped in at a rate of 17.5 g/min using size 16 master-flex tubing for 20 min. The temperature of the glass reactor is then increased to 65° C. $K_2S_2O_8$ (404.21 g) is then added to the reactor all at once immediately upon reaching 65° C. The reaction is allowed to stir at 65° C. for 50 min. Upon cooling, the solution is decanted away and the solid particles are then washed with $H_2O$ (2 L×8) until the conductivity of the wash is less than 20 μS. The resulting material is filtered and dried at 60° C. in a vacuum oven.

This process may generate ~65 g of $MnO_2$ (yield>99%).

In a 2 L Erlenmeyer flask, 60 g of the dry $MnO_2$ powder, produced above, is added to 700 g of DI water. The mixture is stirred with an overhead stirrer using a stir speed of 400 rpm. 2.242 g of lead acetate trihydrate is dissolved in 100 g of DI water and added dropwise to the $MnO_2$ mixture with a MasterFlex pump. Once the addition is complete, the lead solution container is rinsed with 50 g of DI water twice and the dropwise addition continues.

60 min after the lead acetate addition, stirring is stopped, the $MnO_2$ particles settle, and the water is decanted. The rinse and decant procedure is repeated until the ion conductivity measures less than 20 micro-Ohms. The resulting material is filtered and dried at 60° C. using a vacuum oven.

Example 5

Exemplary Cathode Material Including a Stabilizing Agent Formulated from $SiO_2$, $ZrO_2$, and ZnO Doped with $Al_2O_3$ In a 2 L glass reactor, $Mn(NO_3)_2 \times 4H_2O$ (187.67 g) is added to $H_2O$ (1000 g) at 55° C. while stirring with an overhead mechanical stirrer at 400 rpm. Then a $H_2O$ (200 g) suspension of three nano-materials, $SiO_2$ (14 mg), ZnO—$Al_2O_3$ (26 mg), and $ZrO_2$ (130 mg) is added, followed by gelatin (0.12 g).

After allowing to stir at 55° C. for 10 min, a mixture of 40% wt KOH (260 g, aq.) and $H_2O$ (260 g) is pumped in at a rate of 17.5 g/min using size 16 master-flex tubing for 20 min. The temperature of the glass reactor is then increased to 65° C. $K_2S_2O_8$ (404.21 g) is then added to the reactor all at once immediately upon reaching 65° C. The reaction is allowed to stir at 65° C. for 50 min. Upon cooling, the solution is decanted away and the solid particles are then washed with $H_2O$ (2 L×8) until the conductivity of the wash is less than 20 μS. The resulting material is filtered and dried at 60° C. in a vacuum oven.

This process may generate ~65 g of $MnO_2$ (yield>99%).

In a 2 L Erlenmeyer flask, 60 g of the dry $MnO_2$ powder, produced above, is added to 700 g of DI water. The mixture is stirred with overhead stirrer using a stir speed of 400 rpm. 2.242 g of lead acetate trihydrate is dissolved in 100 g of DI water and added dropwise to the $MnO_2$ mixture with a MasterFlex pump. Once the addition was completed, the lead solution container is rinsed with 50 g of DI water twice and the dropwise addition continued.

60 min after the lead acetate addition, stirring is stopped, the $MnO_2$ particles settle, and the water is decanted. The rinse and decant procedure is repeated until the ion conductivity measures less than 20 micro-Ohms. The resulting material is filtered and dried at 60° C. using a vacuum oven.

Example 6

Exemplary Cathode Material Including a Gallium Doped, Lead Coated Manganese Material and Stabilizing Agent Formulated from $SiO_2$, $ZrO_2$, and ZnO doped with $Al_2O_3$ In a 2 L glass reactor, $Mn(NO_3)_2 \times 4H_2O$ (187.67 g) is added to $H_2O$ (1000 g) at 55° C. while stirring with an overhead mechanical stirrer at 400 rpm. Then a $H_2O$ (200 g) suspension of three nano-materials, $SiO_2$ (14 mg), $ZnO$—$Al_2O_3$ (26 mg), and $ZrO_2$ (130 mg) is added. Gelatin (0.11 g) and 0.75 g gallium hydroxide are then added to the stirred solution.

After allowing to stir at 55° C. for 10 min, a mixture of 40% wt KOH (260 g, aq.) and $H_2O$ (260 g) is pumped in at a rate of 17.5 g/min using size 16 master-flex tubing for 20 min. The temperature of the glass reactor is then increased to 65° C. $K_2S_2O_8$ (404.21 g) is then added to the reactor all at once immediately upon reaching 65° C. The reaction was allowed to stir at 65° C. for 50 min. Upon cooling, the solution is decanted away and the solid particles are then washed with $H_2O$ (2 L×8) until the conductivity of the wash is less than 20 µS. The resulting material is filtered and dried at 60° C. in a vacuum oven.

This process may generate ~65 g of $MnO_2$ (yield>99%).

In a 2 L Erlenmeyer flask, 60 g of the dry $MnO_2$ powder, produced above, is added to 700 g of DI water. The mixture is stirred with overhead stirrer at 400 rpm. 2.242 g of lead acetate trihydrate is dissolved in 100 g DI water and added dropwise to the $MnO_2$ mixture with a MasterFlex pump. Once the addition is complete, the lead solution container is rinsed with 50 g DI water twice and the dropwise addition continued.

60 min after the lead acetate addition, stirring is stopped, the $MnO_2$ particles settle, and the water is decanted. The rinse and decant procedure was repeated until the ion conductivity measures less than 20 micro-Ohms. The resulting material is filtered and dried at 60° C. using a vacuum oven.

Example 7

Exemplary Cathode Material Including $MnO_2$ and Stabilizing Agent Formulated from $SiO_2$, $ZrO_2$ and ZnO doped with $Al_2O_3$ In a 2 L glass reactor, $KMnO_4$ (118.15 g) is added to $H_2O$ (1000 g) at 55° C. while stirring with an overhead mechanical stirrer at 400 rpm. Then a $H_2O$ (200 g) suspension of three nano-materials: $SiO_2$ (14 mg), $ZnO$—$Al_2O_3$ (26 mg), and $ZrO_2$ (130 mg) is added. Gelatin (0.12 g) is then added to the stirred solution. After allowing to stir at 55° C. for 10 min, a mixture of 40% wt KOH (260 g, aq.) and $H_2O$ (260 g) is pumped in at a rate of 17.5 g/min using size 16 master-flex tubing for 20 min. $K_2SO_3$ (177.48 g) is then added to the reaction before being allowed to stir at 55° C. for 50 min. Upon cooling, the solution is decanted away and the solid particles are then washed with $H_2O$ (2 L×8) until the conductivity of the wash is less than 20 µS. The resulting material is filtered and dried at 60° C. in a vacuum oven.

This process may generate ~65 g of $MnO_2$ (yield>99%).

In a 2 L Erlenmeyer flask, 60 g of the dry $MnO_2$ powder, produced above, is added to 700 g of DI water. The mixture is stirred with overhead stirrer using a stir speed of 400 rpm. 32.242 g of lead acetate trihydrate is dissolved in 100 g of DI water and added dropwise to the $MnO_2$ mixture with a MasterFlex pump. Once the addition was completed, the lead solution container is rinsed with 50 g of DI water twice and the dropwise addition continued.

60 min after the lead acetate addition, stirring is stopped, the $MnO_2$ particles settle, and the water is decanted. The rinse and decant procedure is repeated until the ion conductivity measures less than 20 micro-Ohms. The resulting material is filtered and dried at 60° C. using a vacuum oven.

Example 8

Exemplary Cathode Material Including Physical Mixture of Stabilized Manganese Oxide Formulated from Particles of $MnO_2$—$SiO_2$, $MnO_2$—$ZrO_2$, and $MnO_2$—$ZnO$—$Al_2O_3$ The exemplary cathode material of Example No. 8 is prepared by physically mixing 25 g of each cathode material prepared as described above in Example Nos. 2, 3, and 4.

B. Characterization of Exemplary Cathodes

Formulations of several exemplary cathodes of the present invention may be characterized along with an $MnO_2$ cathode lacking a stabilizing agent that is provided for purposes of comparison. A summary of formulations for exemplary cathodes of the present invention is provided in Table 1, below.

TABLE 1

Sumary of formulations of exemplary cathodes of the present invention.

| Example No. | Stabilizing Agent | Design Particle Ratio (Stabilizing Agent Particles to $MnO_2$ Particles) | Amount by Weight of $MnO_2$ |
|---|---|---|---|
| 1 | None | None | None |
| 2 | $ZnO$—$Al_2O_3$ | ~5 to 1 | 0.014% |
| 3 | $SiO_2$ | ~1000 to 1 | 0.01% |
| 4 | $ZrO_2$ | ~5 to 1 | 0.11% |
| 5 | $ZnO$—$Al_2O_3$ | ~10 to 1 | 0.028% |
|   | $SiO_2$ | ~1000 to 1 | 0.01% |
|   | $ZrO_2$ | ~50 to 1 | 0.14% |
| 6 | $ZnO$—$Al_2O_3$ | ~10 to 1 | 0.028% |
|   | $SiO_2$ | ~1000 to 1 | 0.01% |
|   | $ZrO_2$ | ~50 to 1 | 0.14% |
| 7[a] | $SiO_2$ | N/A | 0.01 |
|   | $ZrO_2$ | N/A | 0.1 |
| 8 | $ZnO$—$Al_2O_3$ | N/A | N/A |
|   | $SiO_2$ | N/A | N/A |
|   | $ZrO_2$ | N/A | N/A |

[a]The weight percents of the ingredients of the stabilizing agent provided for Example No. 7 are given in Amount by Weight of $MnO_2$.

The physical properties of several of these exemplary cathode materials were tested. The test procedures and results are provided below:

1. Activity

The activities of the exemplary cathode materials described above are measured by titration. Material is crushed and/or grinded with a spatula. If the sample is not completely dry, it is dried in a vacuum oven at 60° C. overnight. 0.100 g of sample is added directly into clean 125 ml flask, and weight is recorded accurately to at least the third decimal place. 10 ml of acetate buffer and 5 ml KI solution (59%) is added to the flask. The flask is swirled to disperse particles. The flask is covered by putting an inverted small plastic cup over its top, and the covered flask is sonicated for 2 hours. 20 ml DI water is added to the flask. The mixture is titrated with $Na_2S_2O_3$ (exact normality was recorded) until solution turns a pale yellow color. Approximately 1 ml starch indicator was added and the titration continued until the mixture turned a milky whitish-yellow color indicating the endpoint.

Activity Calculation:

$$\text{Activity} = \frac{(Vol.\ \text{Titrant (ml)}) \times (\text{Normality of Titrant}) \times 12.388}{\text{Mass of AgO (g)}}$$

2. Particle Size Analysis

The particle size of the product may be analyzed using a Horiba laser diffractometer (model no. LA-930). Diameters on several population distributions (e.g., 5%, 10%, 20%, etc.) may be recorded.

Particle size and shape characterization may also be performed using Scanning Electron Microscopy/Energy Dispersive X-ray Analysis (SEM/EDS). An electron microscope with an energy dispersive X-ray spectrometer may be used for this analysis.

3. Resistivity

The resistivity of the cathode material is determined using the following method: 3 grams of sample cathode material is loaded into a press having a 3.88 cm$^2$ area. A force of from 10 to 40 metric tons is applied to the sample cathode material, and resistance is recorded at every 5 metric ton increment between 10 metric tons and 40 metric tons. Note that the resistivity of the sample is the value at infinite force.

4. Thermal Analysis

Differential scanning calorimetry (DSC) is performed using a differential scanning calorimeter from TA Instruments (model no. 2920) with scan rate of 10° C./min, and thermo gravimetric analysis (TGA) is performed using a Mettler Toledo TGA/SDTA (model no. 851e) at 20° C./min to characterize thermal property of the product.

5. Electrical Properties

Test cells are constructed for evaluation of the electrical properties of the exemplary cathode materials described in Example Nos. 1-8, above. FIG. 2 schematically illustrates the arrangement order of elements used in the manganese-zinc test cells. The electrolyte is formulated from an aqueous alkali hydroxide (e.g., NaOH, KOH, or a combination thereof) is used for purpose of offering OH during charge and discharge process.

The cathode materials, described in Example Nos. 1-4, may be incorporated into prismatic test cells having 2.0 Ah capacities, and the cathode materials described in Example Nos. 5 and 6 may be incorporated into a prismatic test cell having a 3.0 Ah capacity.

The anodes of these test cells 1-5 are formed using 3.6 g zinc, with additives of zinc oxide (13 wt %) and Bi$_2$O$_3$ (0.5 wt %), and 5 wt % PTFE as a binder. The anodes are configured into 43 mm×31 mm rectangles that are pressed at 2 tons. The rectangles along with 32 wt % KOH and NaOH (0.1 g) mixed electrolyte (80:20) with additives of In/brass (0.1 wt %) are wrapped in Solupor® (commercially available from Lydall, Inc. of Rochester, N.H.) and incorporated into the test cells as depicted in FIG. 5.

Test cathodes are formed from cathode material including 3 wt % PTFE binder. The cathode material is formed into 43 mm×31 mm rectangles, pressed at 5.5 T, and, along with 32% KOH and NaOH (0.2 g) mixed electrolyte (80:20) with additives of Pb (0.4 wt %), is wrapped in SL6-8 material commercially available from the Shilong Company.

The test cells also included 2 distinct cellophane films, commercially available from Innovia Films, located between the wrapped electrodes that were soaked and filled with 32% KOH and NaOH mixed electrolyte. Table 3, describes the test cells.

TABLE 3

Test cells for measuring the electrical properties of cathode materials of novel cathode materials.

| Test Cell No. | Cathode Material | Amount of Anode Material (g) | Amount of Cathode Material (g) | Cathode Pouch Material |
|---|---|---|---|---|
| 1 | Example No. 1 | 3.6 | 5.85 | SL6-8 |
| 2 | Example No. 2 | 3.6 | 5.85 | SL6-8 |
| 3 | Example No. 3 | 3.6 | 5.45 | T2 |
| 4 | Example No. 4 | 3.6 | 5.85 | T2 |
| 5 | Example No. 5 | 3.6 | 5.45 | T2 |
| 6 | Example No. 6 | 4.5 | 5.45 | T2 |
| 7 | Example No. 7 | N/A | 3.60 | N/A |
| 8 | Example No. 8 | 0.514 | 0.635 | T2 |

Cathode pouch material designated with the "T2" reference number is formed from a 3-layered co-extruded material. The first layer, i.e., the layer facing the cathode is a mixture of polystyrene sulfonic acid (PSS) and polyacrylic acid (PAA) (35 wt % PAA vs. PSS). The second layer is a filled polyvinyl alcohol, and the third layer is an unfilled polyvinyl alcohol. Structurally, the second layer is interposed between the first and third layers. The first cathode later is formulated from PSS (25 wt % commercial PSS solution (Mw=1M)) and 25 wt % commercial PAA solution (192058 Aldrich Poly(acrylic acid) partial sodium salt solution average Mw ~240,000 by GPC, 25 wt. % in H$_2$O). The second cathode layer is formulated from about ~10 wt % PVA and ZrO$_2$ powder (~35 wt % ZrO$_2$ vs. PVA). And, the third layer was formulated from a 10 wt % PVA stock solution. The film was co-extruded and dried at low dryer temperatures. Each of the three layer is ~10 microns thick.

The "SL6-8" is an 8 micron thick film, that is commercially available from the Shilong Company.

The cycle life of test cells having cathodes comprising a stabilizing agent is determined by repeatedly charging and discharging the test cell to evaluate the reduction of battery capacity as a function of charge cycles. It is noted that the period of time between a discharge and a charge in two consecutive charge cycles is less than 10 minutes.

A typical charge-discharged cycling procedure is as follows:

The battery is charged with a constant current until the battery terminal voltage reached 2.03 volts or more and then the voltage is held fixed at 2.03 volts until the desired charge capacity of the cell is reached. The initial charge current is chosen to charge the battery in 5 hours. After charge the battery is allowed to rest for 10 to 30 minutes. The battery is then discharged at a constant current until the battery voltage reached 1.2 volts or until 5 hours total discharge time is reached. The current is chosen to completely discharge the battery in 5 hours. After discharge the cell is allowed to rest from 10 to 30 minutes.

OTHER EMBODIMENTS

The embodiments disclosed herein have been discussed for the purpose of familiarizing the reader with novel aspects of the invention. Although preferred embodiments of the invention have been shown and described, many changes, modifications and substitutions may be made by one having ordinary skill in the art without necessarily departing from the spirit and scope of the invention as described in the following claims.

What is claimed is:

1. A cathode for use in a rechargeable battery comprising:
a cathode active material comprising:
a stabilizing agent comprising a powder having a mean particle diameter of 200 nm or less; and
manganese,
wherein the powder comprises ZnO particles that are doped with from about 1 wt % to about 10 wt % of $Al_2O_3$ by weight of the ZnO particles, and the powder optionally comprises $ZrO_2$, $SiO_2$, or any combination thereof.

2. The cathode of claim 1, wherein the cathode active material comprises manganese, and the manganese comprises Mn, MnO, $MnO_2$, $Mn_2O_3$, $Mn_3O_4$, $Mn(OH)_2$, $Mn(OH)_4$, $MnO_2(OH)_2$, $Mn(OH)_3$, MnOOH, $Mn(ONa)_2$, $Mn(OK)_2$, $Mn(OLi)_2$, $Mn(ORb)_2$, MnOONa, MnOOK, MnOOLi, MnOORb, $ZnFeMnO_2$, $(MnFe)_2O_3$, $NiMnO_4$, any hydrate thereof, or any combination thereof.

3. The cathode of claim 1, wherein the cathode active material comprises about 0.5 wt % or less of the stabilizing agent by weight of the active material.

4. The cathode of claim 2, wherein the manganese is doped with a first dopant comprising Pb, B, Al, Ga, Zn, Ni, Pd, In, Ag, or any combination thereof.

5. The cathode of claim 2, wherein the manganese is coated with a coating agent comprising Pb, B, Al, Ga, Zn, Ni, Pd, In, Ag, or any combination thereof.

6. An electrochemical cell comprising
a cathode comprising
a cathode active material comprising manganese and a stabilizing agent;
an anode comprising Zn; and
an electrolyte,
wherein the stabilizing agent comprises a powder having a mean particle diameter of 200 nm or less, the powder comprises ZnO particles that are doped with from about 1 wt % to about 10 wt % of $Al_2O_3$ by weight of the ZnO particles, and the powder optionally comprises $ZrO_2$ particles, $SiO_2$ particles, or any combination thereof, and the manganese is associated with at least one particle of a stabilizing agent.

7. The cell of claim 6, wherein the manganese comprises Mn, MnO, $MnO_2$, $Mn_2O_3$, $Mn_3O_4$, $Mn(OH)_2$, $Mn(OH)_4$, $MnO_2(OH)_2$, $Mn(OH)_3$, MnOOH, $Mn(ONa)_2$, $Mn(OK)_2$, $Mn(OLi)_2$, $Mn(ORb)_2$, MnOONa, MnOOK, MnOOLi, MnOORb, $ZnFeMnO_2$, $(MnFe)_2O_3$, $NiMnO_4$, any hydrate thereof, or any combination thereof.

8. The cell of claim 7, wherein the manganese comprises a first dopant comprising Pb, B, Al, Ga, Zn, Ni, Pd, In, Ag, or any combination thereof.

9. The cell of claim 7, wherein manganese is coated with a coating agent comprising Pb, B, Al, Ga, Zn, Ni, Pd, In, Ag, or any combination thereof.

10. A rechargeable battery comprising
a cathode comprising
a cathode active material comprising manganese and a stabilizing agent;
an anode comprising zinc; and
an electrolyte,
wherein the stabilizing agent comprises a powder having a mean particle diameter of 100 nm or less, the powder comprises ZnO particles that are doped with from about 1 wt % to about 10 wt % of $Al_2O_3$ by weight of the ZnO particles, and the powder optionally comprises $ZrO_2$ particles, $SiO_2$ particles, or any combination thereof.

11. The rechargeable battery of claim 10, wherein the manganese comprises Mn, MnO, $MnO_2$, $Mn_2O_3$, $Mn_3O_4$, $Mn(OH)_2$, $Mn(OH)_4$, $MnO_2(OH)_2$, $Mn(OH)_3$, MnOOH, $Mn(ONa)_2$, $Mn(OK)_2$, $Mn(OLi)_2$, $Mn(ORb)_2$, MnOONa, MnOOK, MnOOLi, MnOORb, $ZnFeMnO_2$, $(MnFe)_2O_3$, $NiMnO_4$, any hydrate thereof, or any combination thereof.

12. The rechargeable battery of claim 10, wherein the cathode active material comprises about 7 wt % or less of the stabilizing agent.

13. The rechargeable battery of claim 10, wherein the manganese is doped with a first dopant comprising Pb, B, Al, Ga, Zn, Ni, Pd, In, Ag, or any combination thereof.

14. The rechargeable battery of claim 10, wherein the manganese is coated with a coating agent comprising Pb, B, Al, Ga, Zn, Ni, Pd, In, Ag, or any combination thereof.

15. The rechargeable battery of claim 10, wherein the manganese is doped with a first dopant comprising Ga, and the manganese is coated with a coating agent comprising Pb.

* * * * *